United States Patent [19]

Dannheim et al.

[11] Patent Number: 5,498,713

[45] Date of Patent: Mar. 12, 1996

[54] WATER-SOLUBLE ANTHRAQUINONE COMPOUNDS

[75] Inventors: Jörg Dannheim, Frankfurt am Main; Werner H. Russ, Flörsheim am Main; Hartmut Springer, deceased, late of Königstein/Ts, Germany, by Sebastian Springer, Johannes Springer, heirs

[73] Assignee: Hoechst Akiengesellschaft, Germany

[21] Appl. No.: 168,451

[22] Filed: Dec. 16, 1993

[30] Foreign Application Priority Data

Dec. 18, 1992 [DE] Germany .......................... 42 42 970.6
Jun. 23, 1993 [DE] Germany .......................... 43 20 733.2

[51] Int. Cl.$^6$ ................................................. C07D 251/50
[52] U.S. Cl. ................................................. 544/189
[58] Field of Search ................................................. 544/189

[56] References Cited

U.S. PATENT DOCUMENTS

| | | | |
|---|---|---|---|
| 4,210,593 | 7/1980 | Halmos | 260/397.7 |
| 4,350,632 | 9/1982 | Springer | 260/314.5 |
| 4,394,129 | 7/1983 | Springer | 8/543 |

FOREIGN PATENT DOCUMENTS

| | | |
|---|---|---|
| 57-199878 | 12/1982 | Japan . |
| 2246352 | 1/1992 | United Kingdom . |

OTHER PUBLICATIONS

Journal of the American Chemical Society, Bd. 82, Nr. 5, Mar. 16, 1960.
Chemical Abstracts, vol. 55, No. 16, Aug. 7, 1961, Abstract No. 16563i.
Gazzetta Chimica Italiana, Bd. 90, 1960, Turin Italy, pp. 841–847.

*Primary Examiner*—John M. Ford
*Attorney, Agent, or Firm*—Connolly & Hutz

[57] ABSTRACT

There are described anthraquinone compounds containing a radical of the formula

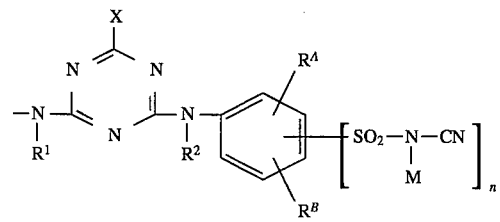

where M is hydrogen, an alkali metal or the mole equivalent of an alkaline earth metal, X is an alkali-detachable radical, such as fluorine or chlorine, $R^1$ is hydrogen or alkyl of 1 to 4 carbon atoms, $R^2$ is hydrogen or alkyl of 1 to 4 carbon atoms, $R^A$ is hydrogen, alkyl of 1 to 4 carbon atoms or alkoxy of 1 to 4 carbon atoms, and $R^B$ is hydrogen, chlorine, bromine or alkoxy of 1 to 4 carbon atoms.

The anthraquinone compounds have fiber-reactive properties and are used as dyes for dyeing and printing hydroxy— and/or carboxamido-containing material, in particular fiber material, for example cellulose fiber materials, wool and synthetic polyamide.

1 Claim, No Drawings

WATER-SOLUBLE ANTHRAQUINONE COMPOUNDS

The invention relates to the field of fiber-reactive dyes.

Japanese Patent Application Publication Sho-57-199 878 discloses inter alia anthraquinonoid dyes containing cyanamido, N-cyanobenzamido and N-cyanosulfonamido groups. However, they have some application defects, such as low degrees of fixation, low color strength and lack of brilliance.

The present invention now provides anthraquinone compounds which when used as fiber-reactive dyes are advantageous over the known dyes and produce dyeings of high color strength in brilliant blue shades. The new anthraquinone compounds conform to the formula (1)

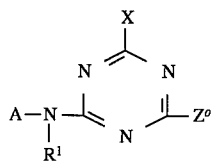
(1)

where
A is a radical of the formula (2)

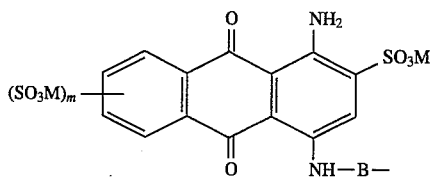
(2)

where

M is as hydrogen or an alkali metal, such as sodium, potassium and lithium, or the mole equivalent of an alkaline earth metal, such as calcium, and is preferably hydrogen and in particular an alkali metal, m is zero or 1 (when zero, the group in question is hydrogen ), and B is phenylene which can be substituted by 1 to 4 substituents selected from the group of substituents consisting of 2 sulfo, 1 carboxy, 4 alkyl of 1 to 4 carbon atoms, such as ethyl and in particular methyl, and 2 alkoxy of 1 to 4 carbon atoms, such as ethoxy and in particular methoxy, or is naphthylene which can be substituted by 1, 2 or 3 sulfo groups, or is alkylene of 1 to 4 carbon atoms, such as propylene and ethylene, or is phenylenealkylene or alkylenephenylene, wherein the alkylene radicals have 1 to 4 carbon atoms and the phenylene radicals are unsubstituted or substituted by 1, 2 or 3 substituents from alkyl of 1 to 4 carbon atoms, such as ethyl and in particular methyl, alkoxy of 1 to 4 carbon atoms, such as ethoxy and in particular methoxy, and sulfo, or is cyclohexylene or alkylenecyclohexylene or cyclohexylenealkylene or alkylenecyclohexylenealkylene, wherein the cyclohexylene radicals may additionally be substituted by 1 or 2 methyl groups and the alkylene radicals are those of 1 to 4 carbon atoms, or is a radical of the formula -phen-D-phen-, in which each phen, identical to or different from the other, is phenylene, preferably para-phenylene, which is unsubstituted or substituted by 1 or 2 substituents from the group consisting of sulfo, alkyl of 1 to 4 carbon atoms, such as ethyl and in particular methyl, and alkoxy of 1 to 4 carbon atoms, such as ethoxy and in particular methoxy, and D is a direct bond or a group of the formula —NH—, —O—, —SO₂—, —CONH—, —NH—CO—, —SO₂—NH—, —NH—SO₂— and —SO₂—NH—SO₂—, R¹ is hydrogen or alkyl of 1 to 4 carbon atoms, such as methyl and ethyl, preferably hydrogen, X is an alkali-detachable radical, for example fluorine, chlorine, bromine, methylsulfonyl, preferably chlorine and fluorine, Z° is a radical of the formula (3)

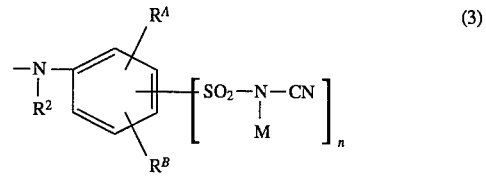
(3)

where

M is as defined above,

R² is hydrogen or alkyl of 1 to 4 carbon atoms, such as methyl and ethyl, preferably hydrogen, R^A is hydrogen, alkyl of 1 to 4 carbon atoms, such as ethyl and in particular methyl, or alkoxy of 1 to 4 carbon atoms, such as ethoxy and in particular methoxy, R^B is hydrogen, bromine, chlorine or alkoxy of 1 to 4 carbon atoms, such as ethoxy and in particular methoxy, and n is 1 or 2, excepting, however, compounds of the formula (1) in which at one and the same time B is a substituted or unsubstituted phenylene radical of the above meaning, Z° is 3-cyanoaminosulfonylphenylamino and n is 1, compounds of the formula (1) where at one and the same time B is alkylene of 1 to 4 carbon atoms, Z° is 4-methoxy-5-cyanoaminosulfonylphenylamino, m is zero and n is 1, and compounds of the formula (1) where at one and the same time B is phenylenealkylene, alkylenephenylene, cyclohexylene, alkylenecyclohexylene, cyclohexylenealkylene or alkylenecyclohexylenealkylene of the above meaning and n is 1.1

Radicals of the formula (2) include for example 1-amino-2-sulfoanthraquinone-4-amino-(3'-sulfo-2',4',6'-trimethyl)phen-5'-yl, 1-amino-2-sulfoanthraquinone-4-amino(3'-sulfo)phen-4'-yl, 1-amino-2,7-disulfoanthraquinone-4-amino-(3'-sulfo)phen-4'-yl, 1-amino-2,6-disulfoanthraquinone-4-amino-(3'-sulfo)phen-4'-yl, 1-amino-2,7-disulfoanthraquinone-4-amino-(4'-sulfo)phen-3'-yl, 1-amino-2,6-disulfoanthraquinone-4-amino-(4'-sulfo)phen-3,-yl, 1-amino-2-sulfoanthraquinone-4-amino-(4'-sulfo)phen-3'-yl, 1-amino-2-sulfoanthraquinone-4-amino-(2',4'-disulfo)phen-3'-yl, 1-amino-2-sulfoanthraquinone-4-amino-(2',4'-disulfo)phen-5'-yl, 1-amino-2-sulfoanthraquinone-4-amino-(3',2'-disulfo)diphen(4',1")-4"-yl, 1-amino-2-sulfoanthranthraquinone-4-amino-(3"-sulfo)diphen-(4',1")-4"-yl, 1-amino-2-sulfoanthraquinone-4-amino-(2'-sulfo)phenyl-4'-methyl, 1-amino-2,6-disulfoanthraquinone-4-amino-(2'-sulfo)phen-4'-yl, 1-amino-2-sulfoanthraquinone-4-aminocyclohex-4'-yl, 1-amino-2,7-disulfoanthraaquinone-4-amino-(2'-sulfo)phen-4,-yl, 1-amino-2,5-disulfoanthraquinone-4-amino-(2'-sulfo)phen-4,-yl, 1-amino-2,8-disulfoanthraquinone-4-amino-(2,-sulfo)phen-4,-yl, 1-amino-2,6-disulfoanthraquinone-4-amino-(2,-sulfo)phen-3'-yl, 1-amino-2,7-disulfoanthraquinone-4-amino-(2'-sulfo)-sulfo)phen-3'-yl, 1-amino-2-sulfoanthraquinone-4-amino-(4'-methyl)cyclohex-3,-yl, 1-amino-2-sulfoanthraquinone-4-amino-(2'-sulfo)phenyl-5,-methyl, 1-amino-2-sulfoanthraquinone-4-amino-(2,-sulfo-4,-methoxy)phenyl-5'-methyl, 1-amino-2-sulfoanthraquinone-4-amino-(2'-sulfo-6'-methoxy)phenyl-3,-methyl, 1-amino-2- sulfoanthraquinone-4-amino-(3,-sulfo-2,,6,-dimethyl)-phenyl-5'-methyl, 1-amino-2-sulfoanthraquinone-4-amino-(2'-sulfo-4'-methyl)phenyl-6'-methyl, 1-amino-2,6-disulfoanthraquinone-4-amino-(2,-sulfo-4,-methyl)phenyl-6'-methyl, 1-amino-2-sulfoanthraquinone-4-amino-(2'-sulfo-6'-methyl)phen-4,-yl, 1-amino-2-sulfoanthraquinone-4-amino-(4'-sulfo-6,-methyl)phen-3,-yl, 1-amino-2-sulfoanthraquinone-4-amino-(3,-sulfo-2',4',6'-trimethyl)phenyl-5'-methyl, 1-amino-2,6-disulfoanthraquinone-4-amino-(3'-sulfo-6,-methyl)phen-5,-yl, 1-amino-2-sulfoanthraquinone-4-amino-(3,_sulfo-6,-methyl)phen-5'yl, 1-amino-2,5-disulfoanthraquinone-4-amino-(6,_methyl)phen-5'-yl, 1-amino-2,6-disulfoanthraquinone-4-amino-(6'-methyl)phen-5'-yl, 1-amino-2,5,8-trisulfoanthraquinone-4-aminophen-4,-yl, 1-amino-2,6-disulfoanthraquinone-4-aminophen-4'-yl, 1-amino-2,7-disulfoanthraquinone-4-aminophen-4'-yl, 1-amino-2,5-disulfoanthraquinone-aminophen-4'-yl, 1-amino-2,6-disulfoanthraquinone-4-aminophen-3'-yl, 1-amino-2,5-disulfoanthraquinone-4-aminophen-3'-yl, 1-amino-2,6-disulfoanthraquinone-4-amino-(3,-sulfo-2',6'-dimethyl)phenyl-5'-methyl, 1-amino-2,7-disulfoanthraquinone-4-amino-(3'-sulfo,2',6'-dimethyl)phenyl-5'-methyl, 1-amino-2,5-disulfoanthraquinone-4-amino-(2'-sulfo-4'-methyl)phenyl-3-methyl, 1-amino-2,8-disulfoanthraquinone-4-amino-(4'-methyl)phenyl-3'-methyl, 1-amino-2,5,8-trisulfoanthraquinone-4-amino-(2',6'-dimethyl)phenyl-3'-methyl, 1-amino-2,8-disulfoanthraquinone-4-amino-(2'-sulfo)- phenyl-3'-methyl, 1-amino-2,7-disulfoanthraquinone-4-amino-(2'-sulfo-4'-methoxy)phenyl-3'-methyl, 1-amino-2,5-disulfoanthraquinone-4-amino-(3'-sulfo)phen-4'-yl, 1-amino-2,5-disulfoanthraquinone-4-amino-(3'-sulfo-6'-methyl)phen-5'-yl, 1-amino-2,7-disulfoanthraquinone-4aminoeth-2'-yl, 1-amino-2-sulfoanthraquinone-4-amino-phen-3'-yl-1''-sulfonylamidosulfonyl-4''-sulfophen-3 ''-yl, 1-amino-2,6-disulfoanthraquinone-4-aminophen-4'-yl-1''-sulfonylamidosulfonylphen-4''-yl and 1-amino-2-sulfoanthraquinone-4-aminophen-3'-yl-1''-sulfonylamidosulfonylphen-3''-yl, preferably 1-amino-2-sulfoanthraquinone-4-amino-(2',4',6'-trimethyl-5'-sulfo)phen-3-yl and 1-amino-2-sulfoanthraquinone-4-amino-(4'-sulfo)phen-3'-yl.

Of the anthraquinone compounds of the formula (1) according to the invention, attention may be drawn in particular to those which conform to the formulae (1a) and (1b)

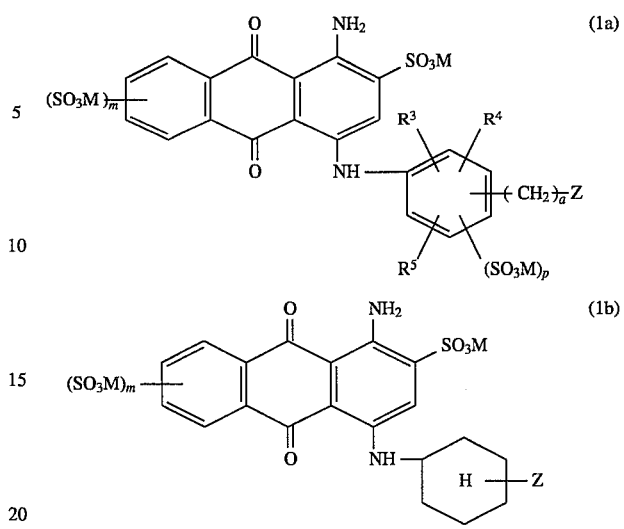

where

M and m each have one of the abovementioned meanings, in particular one of the preferred meanings, $R^3$ is hydrogen or alkyl of 1 to 4 carbon atoms, such as ethyl and in particular methyl, $R^4$ is hydrogen or alkyl of 1 to 4 carbon atoms, such as ethyl and in particular methyl, $R^5$ is hydrogen or alkyl of 1 to 4 carbon atoms, such as ethyl and in particular methyl, p is zero, 1 or 2, preferably 1 (when zero, the group in question being hydrogen), a is zero or 1, preferably zero, and Z is a radical of the formula (4)

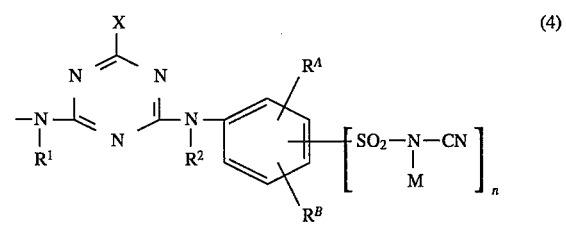

where $R^1$, $R^2$, $R^A$, $R^B$, M, n and X each have the abovementioned meanings, in particular the preferred meanings, and X is particularly preferably chlorine or fluorine, especially chlorine.

In the formula (1a) the symbols $R^3$, $R^4$ and $R^5$ are each preferably methyl.

Of these preferred anthraquinone compounds particular preference is given to those which conform to the formula (5)

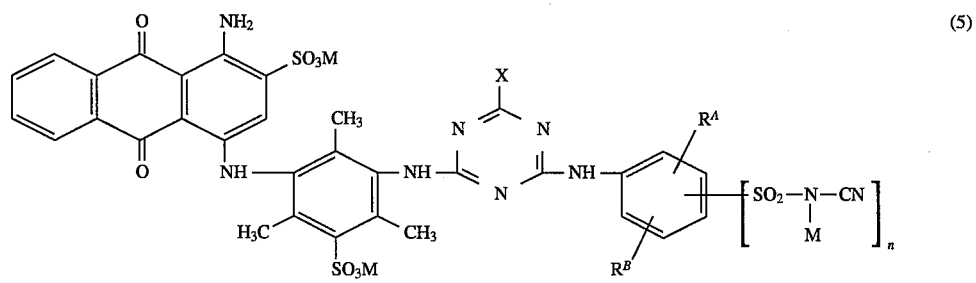

where M, $R^A$, $R^B$ and n each have one of the abovementioned meanings, in particular one of the preferred meanings, X is chlorine or fluorine, preferably chlorine, n is preferably 1, and the cyanamidocarbonyl group on the benzene ring is meta or para to the —NH— group.

The present invention further provides a process for preparing the anthraquinone compounds of the formula (1) according to the invention, which comprises reacting a halo-s-triazine compound of the formula (6)

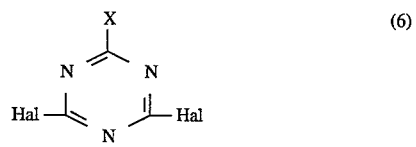
(6)

where X has one of the abovementioned meanings, in particular one of the preferred meanings, and Hal is halogen, such as chlorine or fluorine, for example 2,4,6-trifluoro-1,3,5-triazine (cyanuric fluoride) or 2,4,6-trichloro-1,3,5-triazine (cyanuric chloride), with an amino-containing anthraquinone compound of the formula A-NHR$^1$, where A and R$^1$ each have one of the abovementioned meanings, in particular one of the preferred meanings, and with an amino compound of the formula (7)

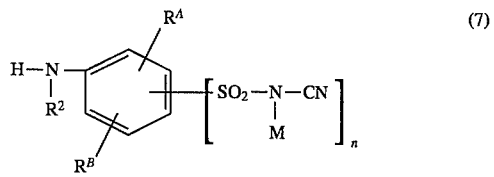
(7)

where $R^2$, $R^A$, $R^B$, M and n are each as defined above, in any desired order.

Variants of the process according to the invention which are likewise according to the invention comprise for example reacting a compound of the formula (8)

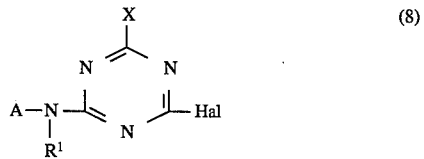
(8)

in which A, R$^1$, X and Hal are each as defined above, with an amino compound of formula (7), or a compound of the formula (9)

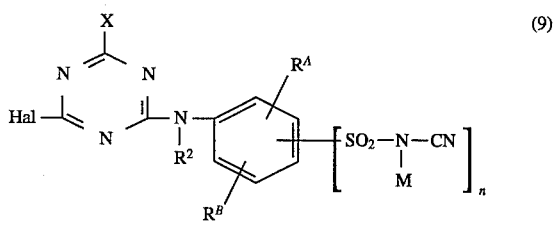
(9)

where Hal, X, $R^2$, $R^A$, $R^B$, M and n are each as defined above, with a compound of the formula A-NHR$^1$ where A and R$^1$ are each as defined above. Of these, the variant whereby a compound of the formula (8) is reacted with a compound of the formula (7) is preferred.

The reactions of the starting compounds are carried out in an aqueous or aqueous-organic medium in suspension or solution. If the reactions are carried out in an aqueous-organic medium, the organic medium will be for example acetone, dimethylformamide, dimethyl sulfoxide or N-methylpyrrolidone. Advantageously, the hydrogen halide liberated in the course of the condensation is continuously neutralized by the addition of aqueous alkali metal hydroxides, carbonates or bicarbonates. The first condensation reaction of the halo-s-triazine of the formula (6) is in general carried out at a temperature between −5° C. and +20° C., in the case of Hal being fluorine preferably at a temperature of between -5° C. and +5° C., and at a pH between 2 and 10, preferably between 4 and 6. The subsequent condensation reaction with the second amino compound is in general carried out at a temperature between 5° and 60° C., in the case of Hal being fluorine preferably at a temperature between 0° and 20° C., and at a pH between 3 and 9, preferably between 6 and 7.

More particularly, the reaction between a compound of the formula (8) and a compound of the formula (7) is carried out at a temperature between 5° and 60° C., preferably between 10° and 55° C., and at a pH between 3 and 9, preferably between 6 and 7, although when in the compound of the formula (8) Hal is a fluorine atom the reaction is preferably carried out at a temperature between 0° and 20° C.

Similarly, the reaction of a compound of the formula (9) with a compound of the formula A-NHR$^1$ is carried out at a temperature between 5° and 40° C., preferably between 10° and 30° C., and at a pH between 3 and 9, preferably between 4 and 6, although when Hal in the compound of the formula (9) is fluorine the reaction is preferably carried out at a temperature between 0° and 20° C.

The starting compounds of the formula (8) can be prepared in a conventional manner of reacting halogen-substituted triazines with amino-containing compounds, as described for example above for the procedures of the invention, for instance likewise in aqueous or aqueous-organic medium in general at a temperature between −5° C. and +40° C., preferably between 0° and 30° C., and at a pH between 2 and 10, preferably between 5 and 7, although when Hal in the starting compound of the formula (6) is fluorine the reaction temperature is preferably between −5° C. and +5° C. The same method and conditions can be used to prepare the starting compounds of the formula (9) by reacting a compound of the formula (6) with a compound of the formula ( 7 ).

The starting compounds of the formula (6) and of the formula A-NHR$^1$ are generally known and have been numerously described in the literature. Compounds of the formula (6) include for example cyanuric chloride and cyanuric fluoride.

Starting compounds of the formula A-NHR$^1$ include for example 1-amino-2-sulfo-4-(3'-sulfo-2',4',6'-trimethyl-5'-aminophenyl)aminoanthraquinone, 1-amino-2-sulfo-4-(3'-sulfo-4'-aminophenyl)aminoanthraquinone, 1-amino-2,7-disulfo-4-(3'-sulfo-4'-aminophenyl)aminoanthraquinone, 1-amino-2,6-disulfo-4-(3'-sulfo-4'-aminophenyl)aminoanthraquinone, 1-amino-2,7-disulfo-4-(4'-sulfo-3'-aminophenyl)aminoanthraquinone, 1-amino-2,6-disulfo-4-(4'-sulfo-3'-aminophenyl)aminoanthraquinone, 1-amino-2-sulfo-4-(4'-sulfo-3'-aminophenyl)aminoanthraquinone, 1-amino-2-sulfo-4-(2',4'-disulfo-5'-aminophenyl)aminoanthraquinone, 1-amino-2-sulfo-4-[3',2"-disulfo-4-aminodiphenyl(4',1")] aminoanthraquinone, 1-amino-2-sulfo-4-[3"-sulfo-4"-aminodiphenyl(4',1")]aminoanthraquinone, 1-amino-2-sulfo-4-(2'-sulfo-4'-aminomethylphenyl)aminoanthraquinone, 1-amino-2-sulfo-4-[2'-sulfo-4,-(N-methylamino)methylphenyl]aminoanthraquinone, 1-amino-2,6-di-sulfo-4-(2'-sulfo-4'-aminophenyl)aminoanthraquinone, 1-amino-2-sulfo-4-(4'-aminocyclohexyl)aminoanthraquinone, 1-amino-2,6-disulfo-4-(4,-aminocyclohexyl)aminoanthraquinone, 1-amino-2,7-disulfo-4-(4'-aminocyclohexyl)aminoanthraquinone, 1-amino-2,5-disulfo-4-(4'-aminocyclohexyl)hexyl)aminoanthraquinone, 1-amino-2,8-disulfo-4-(4'-aminocyclohexyl)aminoanthraquinone, 1-amino-2,7-disulfo-4-(4'-methylaminocyclohexyl)aminoanthraquinone, 1-amino2,6-disulfo-4-(3'-aminocyclohexyl)aminoanthraquinone, 1-amino-2,7-disulfo-4-(3'-aminocyclohexyl)aminoanthraquinone, 1-amino-2-sulfo-4-(4'-methyl-3'-aminocyclohexyl)aminoanthraquinone, 1-amino-2-sulfo-4-[2'-sulfo-4'(N-methyl amino )methylphenyl] aminoanthraquinone, 1-amino-2-sulfo-4-(2'-sulfo-5'-aminomethylphenyl)aminoanthraquinone, 1-amino-2-sulfo-4-[2'-sulfo-5'-(N-methylamino)methylphenyl] aminoanthraquinone, 1-amino-2-sulfo-4-(2'-sulfo-4'-methoxy-5'-aminomethylphenyl)aminoanthraquinone, 1-amino-2-sulfo-4-[2'-sulfo-4'-methoxy-5'-(N-methylamino)methylphenyl]aminoanthraquinone, 1-amino-2-sulfo-4-(2'-sulfo-6'-methoxy-3'-aminomethylphenyl)aminoanthraquinone, 1-amino-2-sulfo-4-(3'-sulfo-2',6'-dimethyl-5'-aminomethylphenyl)aminoanthraquinone, 1-amino-2-sulfo-4-(2'-sulfo-4'-methyl-6'-aminomethylphenyl)aminoanthraquinone, 1-amino-2-sulfo-4-[2'-sulfo-4'-methyl-6'-(N-methylamino)methylphenyl] aminoanthraquinone, 1-amino-2,6-disulfo-4-[2'-sulfo-4'-methyl-6'-aminomethylphenyl]aminoanthraquinone, 1-amino-2-sulfo-4-(2'-sulfo-6'-methyl-4'-aminophenyl)aminoanthraquinone, 1-amino-2-sulfo-4-(4'-sulfo-6'-methyl-3'-aminophenyl)aminoanthraquinone, 1-amino-2-sulfo-4-(3'-sulfo-2',4',6'-trimethyl-5'-aminomethylphenyl)aminoanthraquinone, 1-amino-2,6-disulfo-4-(3'-sulfo-6'-methyl-5'-aminophenyl)aminoanthraquinone, 1-amino-2-sulfo-4-(3'-sulfo-6'-methyl-5'-aminophenyl)aminoanthraquinone, 1-amino-2,5-disulfo-4-(6'-methyl-5'-aminophenyl)aminoanthraquinone, 1-amino-2,6-disulfo-4-(6'-methyl-5'-aminophenyl)aminoanthraquinone, 1-amino-2,5,8-trisulfo-4-(4'-aminophenyl)aminoanthraquinone, 1-amino-2,6-disulfo-4-[2'-sulfo-4'-(N-methylamino)methylphenyl] aminoanthraquinone, 1-amino-2,7-disulfo-4-[2'-sulfo-4'-(N-methylamino)methylphenyl]aminoanthraquinone, 1-amino-2,5,8-trisulfo-4-[4'-(N-methylamino)methylphenyl] aminoanthraquinone, 1-amino-2,8-disulfo-4-[4,-(N-methylamino)methylphenyl]aminoanthraquinone, 1-amino-2,6-disulfo-4-(4'-aminophenyl)aminoanthraquinone, 1-amino-2,7-disul of-4-(4'-aminophenyl)aminoanthraquinone, 1-amino-2,5-disulfo-4-(4'-aminophenyl)aminoanthraquinone, 1-amino-2,6-disulfo-4-(3'-aminophenyl)aminoanthraquinone, 1-amino-2,5-disulfo-4-(3'-aminophenyl)aminoanthraquinone, 1-amino-2,6-disulfo-4-(3'-sulfo-2',6'-dimethyl-5'-aminomethylphenyl)aminoanthraquinone, 1-amino-2,6-disulfo-4-[3'-sulfo-2',6'-dimethyl-5'-(N-methylamino)methylphenyl] aminoanthraquinone, 1-amino-2,7-disulfo-4-(3'-sulfo-2',6'-dimethyl-5'-aminomethylphenyl)aminoanthraquinone, 1-amino- 2,7-disulfo-4-[3'-sulfo-2',6'-dimethyl-5'-(N-methylamino))methylphenyl] aminoanthraquinone, 1-amino-2,7disulfo-4-[2',6'-dimethyl-5'-(N-methylamino)methylphenyl ]aminoanthraquinone, 1-amino-2,5-disulfo-4-(2'-sulfo-4'-methyl- 3'-aminomethylphenyl)aminoanthraquinone, 1-amino-2,8-disulfo-4-(4'-methyl-3'-aminomethylphenyl)aminoanthraquinone, 1-amino-2,5,8-trisulfo-4-(2',6'-dimethyl-3'-aminomethylphenyl)aminoanthraquinone, 1-amino-2,7-disulfo-4-[4'-methoxy-3'-(N-methylamino)methylphenyl] aminoanthraquinone, 1-amino-2,5-disulfo-4-[2'-sulfo-4'-methoxy-3'-(N-methylamino)methylphenyl] aminoanthraquinone, 1-amino-2,8-disulfo-4-(2'-sulfo-3'-aminomethylphenyl)aminoanthraquinone, 1-amino-2,7-disulfo-4-(2'-sulfo-4'-methoxy-3'-aminomethylphenyl)aminoanthraquinone, 1-amino-2,5-disulfo-4-(3'-sulfo-4'-aminophenyl)aminoanthraquinone, 1-amino-2,5-disulfo-4-(3'-sulfo-6'-methyl-5'-aminophenyl)aminoanthraquinone, 1-amino-2,7-disulfo-4-(β-aminoethyl)aminoanthraquinone, 1-amino-2,6-disulfo-4-[β-(N-methylamino)ethyl]aminoanthraquinone, 1-amino-2-sulfo-4-[3'-(4"-sulfo-3"-aminophenyl)sulfonylamidosulfonylphenyl] aminoanthraquinone, 1-amino-2,6-disulfo-4-[4'-(4"-aminophenyl)sulfonylamidosulfonylphenyl] aminoanthraquinone and 1-amino-2-sulfo-4-[3'-(4"-aminophenyl)sulfonylamidosulfonylphenyl] aminoanthraquinone.

The starting compounds of the formula (7) are in some instances known (see J. Org. Chem. 31, 959 (1966)); the compounds 2-methoxy-5-cyanamidosulfonylaniline, 2-methoxy-5-methyl-4-cyanamidosulfonylaniline, 2,5-dimethoxy-4-cyanamidosulfonylaniline and 2-chloro-5-cyanamidosulfonylaniline and also those of the formula (7) where n is 2 and also their N-($C_2$-$C_5$)-alkanoyl derivatives, such as N-acetyl derivatives, are new and therefore likewise form part of the subject-matter of the present invention.

The compounds of the formula (7) can be prepared by reducing a nitro compound of the formula (10)

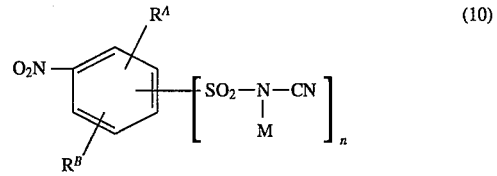

where $R^A$, $R^B$, M and n are each as defined above, in a conventional manner, preferably catalytically in aqueous solution or suspension, to the compound of the formula (7) where $R^2$ is hydrogen. Preferably, however, they are obtained by reacting the sulfonyl chlorides of the N-alkanoylanilines, preferably of the N-acetylanilines, with cyanamide or a salt of cyanamide in aqueous suspension at a temperature between 0° and 30° C. and at a pH between 6 and 12 and subsequent hydrolysis of the alkanoylamino group to the amino group of the aniline compound of the formula (7) where $R^2$ is hydrogen. The introduction of an alkyl group (in the case of $R^2$ being alkyl) can then be carried out subsequently with the aid of an alkylating agent, such as a dialkyl sulfate, in a conventional manner similarly to known procedures.

The starting compounds of the formula (10) can be prepared in a manner similar to literature-described methods (see J. Org. Chem. 31, 959 (1966) and Chem. Ind. (London) 1963, 1559), for example by reacting the acid chlorides of the formula (11)

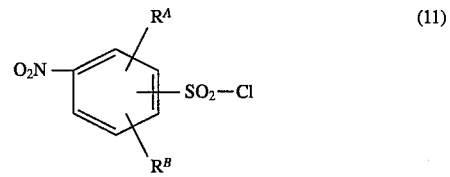

where
$R^A$ and $R^B$ are as defined above, with cyanamide or a salt of cyanamide in aqueous suspension at a temperature between 0° and 20° C. and at a pH maintained between 7 and 11.

Starting compounds of the formula (7) include in particular 4-cyanamidosulfonylaniline, 2-methoxy-4-cyanamidosulfonylaniline, 2,5-dimethoxy-4-cyanamidosulfonylaniline, 2-chloro-5-cyanamidosulfonylaniline and 2-methoxy-5-methyl-4-cyanamidosulfonylaniline.

The separation of the dyes of the formula (1) prepared according to the invention—hereinafter termed "dyes (1)"—from the synthesis batches is effected according to generally known methods either by precipitating from the reaction medium by means of electrolytes, for example sodium chloride or potassium chloride, or by evaporating the reaction solution, for example by spray-drying, in which case a buffer substance may be added to this reaction solution. They have fiber-reactive properties and very good dye properties. They can therefore be used for dyeing and printing hydroxy- and/or carboxamido-containing material, in particular fiber material, but also leather. Similarly, the as-synthesized solutions of compounds according to the invention may be used directly as liquid dyes, optionally after addition of a buffer substance and optionally after concentrating.

The present invention therefore also provides for the use of the dyes (1) for dyeing and in particular printing hydroxy- and carboxamido-containing materials, i.e. processes for applying the dyes (1) to these substrates. The materials are preferably employed in the form of fiber materials, in particular textile fibers, such as yarns, wound packages and fabrics.

Hydroxy-containing materials are natural or synthetic hydroxy-containing materials, for example cellulose fiber materials, including the form of paper, or regenerated products thereof, and polyvinyl alcohols. Cellulose fiber materials are preferably cotton but can also be other vegetable fibers, such as linen, hemp, jute and ramie fibers, while regenerated cellulose fibers are for example staple viscose and filament viscose.

Carboxamido-containing materials include for example synthetic and natural polyamides and polyurethanes, in particular in the form of the fibers, for example wool and other animal hairs, silk, leather, nylon-6,6,nylon-6, nylon-11 and nylon-4.

The dyes (1) can be applied to and fixed on said substrates, in particular on the fiber materials mentioned, by the techniques known for water-soluble dyes, in particular for fiber-reactive dyes. For instance, on cellulose fibers they produce dyeings in good color yields. The dyeing is carried out at temperatures between 40° and 105° C., optionally at temperatures up to 130° C. under superatmospheric pressure, and optionally in the presence of customary dyeing assistants, from an aqueous bath. One possible procedure is to introduce the material into the hot bath, gradually heat the bath to the desired dyeing temperature, and complete the dyeing process at that temperature. The neutral salts which speed up the exhaustion of the dye can also if desired not be added to the bath until the actual dyeing temperature has been reached.

Padding processes likewise produce dyeings on cellulose fibers in excellent color yields, fixation being possible in a conventional manner by batching at room temperature or elevated temperature, for example at up to 60° C., by steaming or using dry heat.

Similarly, the conventional printing processes for cellulose fibers - which are preferably carried out in a single phase, for example by printing with a print paste containing sodium bicarbonate or another acid-binding agent and the dye (1) and subsequent steaming at from 100° to 103° C., or can be carried out in two phases, for example by printing with a neutral or weakly acid print paste containing the dye (1) and subsequent fixation either by passing the printed material through a hot electrolyte-containing alkaline bath or by overpadding with an alkaline electrolyte-containing padding liquor and subsequent hatching of this treated material or subsequent steaming or subsequent treatment with dry heat —produce strong prints with well defined contours and a clear white ground. Variable fixing conditions have only little effect on the outcome of the prints. Not only in dyeing but also in printing the degrees of fixation obtained with the dyes (1) are very high. The hot air used in dry heat fixing by the customary thermofix processes has a temperature of from 120° to 200° C. In addition to customary steam at from 101° to 103° C. it is also possible to use superheated steam or high-pressure steam having temperatures of up to 160° C.

The acid-binding agents responsible for fixing the dyes to the cellulose fibers include for example water-soluble basic salts of alkali metals and of alkaline earth metals of inorganic or organic acids, and compounds which are capable of releasing alkali when hot. Of particular suitability are the alkali metal hydroxides and alkali metal salts of weak to medium inorganic or organic acids, the preferred alkali metal compounds being the sodium and potassium compounds. These acid-binding agents include for example sodium hydroxide, potassium hydroxide, sodium carbonate, sodium bicarbonate, potassium carbonate, sodium formate, sodium dihydrogenphosphate and disodium hydrogenphosphate.

Treating the dyes (1) with the acid-binding agents with or without heating bonds the dyes chemically to the cellulose fiber; especially the dyeings on cellulose, after they have been given the usual after treatment of rinsing to remove unfixed dye portions, show excellent wet fastness properties, in particular since the unfixed dye portions are readily washed off because of their good cold water solubility.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at a temperature between 60° and 98° C. However, the dyeings can also be carried out at the boil or at temperatures of up to 120° C. (under superatmospheric pressure).

The dyeings and prints prepared using the dyes (1) of the invention have high color strength and good light fastness properties and good wet fastness properties, such as wash, fulling, water, seawater, crossdyeing and perspiration fastness properties, but also good fastness to pleating, hot pressing and rubbing. Attention has to be drawn in particular to their alkaline perspiration light fastness and the good wet light fastness of dyeings wetted with tap water.

The Examples which follow illustrate the invention. The compounds described by means of a formula are shown in the form of the free acid; generally they are prepared and isolated in the form of their alkali metal salts and used for dyeing in the form of their salts. In the same way the starting compounds mentioned in the form of the free acid in the Examples which follow, in particular Table Examples, can be used in the synthesis as such or in the form of their salts, preferably alkali metal salts, such as sodium or potassium salts.

Parts and percentages are by weight, unless otherwise stated. Parts by weight bear the same relation to parts by volume as the kilogram to the liter.

The visible absorption maxima ($\lambda_{max}$) reported for the compounds of the invention were determined on aqueous solutions of their alkali metal salts. In the Table Examples the $\lambda_{max}$ values are shown in parentheses in the hue column; the wavelength is given in nm.

The $^{13}$C-NMR analyses were carried out in dimethyl sulfoxide and using tetramethylsilane as internal standard, unless otherwise stated.

EXAMPLE A 302 parts of 4-acetylaminobenzenesulfonyl chloride are suspended in 1500 parts of water at 0° C.; 75.6 parts of cyanamide are added, and aqueous sodium hydroxide solution is used to set a pH between 10 and 11 which is maintained during the reaction which is carried out at a temperature between 20° and 30° C. in the course of about 2 hours. Then 400 parts by volume of 33% strength aqueous sodium hydroxide solution are added, the batch is heated at 100° C. for one hour and then adjusted with aqueous hydrochloric acid to a pH between 5 and 6. The result obtained is the aqueous solution of the sodium salt of 4-cyanamidosulfonylaniline, which can be used directly in the synthesis of the anthraquinone compounds conforming to the formula (1) of the invention.

The 4-cyanamidosulfonylaniline itself can be precipitated from the batch at a pH of 2 and at about 10° C. as a solid substance, and isolated.

EXAMPLE B 132 parts of 3-acetylamino-4-methoxybenzenesulfonyl chloride and 25 parts of cyanamide are suspended in 400 parts of water at 0° C. and reacted with one another at a temperature of about 20° C. while a pH between 9 and 11 is maintained. Then 130 parts by volume of 33% strength aqueous sodium hydroxide solution are added and the acetylamino group is hydrolyzed at 100° C. in the course of an hour. The batch is then cooled down to 10° C. and brought to pH 2 with hydrochloric acid and the precipitated 2-methoxy-5-cyanamidosulfonylaniline is isolated.

$^1$H-NMR analysis (in hexadeuterodimethylsulfoxide and tetramethylsilane as internal standard):

3.85 ppm (s, 3H), 7.12 ppm (d, 1H), 7.4 ppm (dd, 1H), 7.5 ppm (d, 1H).

EXAMPLE C

To prepare the starting 2,5-dimethoxy-4-cyanamidosulfonylaniline it is possible to proceed in a manner similar to that of Example A or B by replacing the 3-acetylamino-4-methoxybenzenesulfonyl chloride by an equivalent amount of 4-acetylamino-2,5-dimethoxybenzenesulfonyl chloride. In the same way 2-chloro-5-cyanamidosulfonylaniline can be prepared from 3-acetylamino-4-chlorobenzenesulfonyl chloride and 2-methoxy-5-methyl-4-cyanamidosulfonylaniline from 4-acetylamino-2-methoxy-5-methylbenzenesulfonyl chloride.

EXAMPLE 1

To a 0° C. solution of 20.5 parts of 1-amino-4-(3'-amino-2',4',6'-trimethylphenyl) aminoanthraquinone-2,5'-disulfonic acid in 250 parts of water are added 7.7 parts of 2,4,6-trichloro-s-triazine; during the reaction at 0° C. which takes about 1 hour, a pH of 4 is maintained with aqueous sodium hydroxide solution. Then 7.3 parts of 4-cyanamidosulfonylaniline are added, the temperature of the batch is heated to 50° C., and the second reaction is carried out at a pH of 6 in the course of two hours. The anthraquinone compound of the invention is isolated in a conventional manner by salting out with sodium chloride. Written in the form of the free acid it has the formula

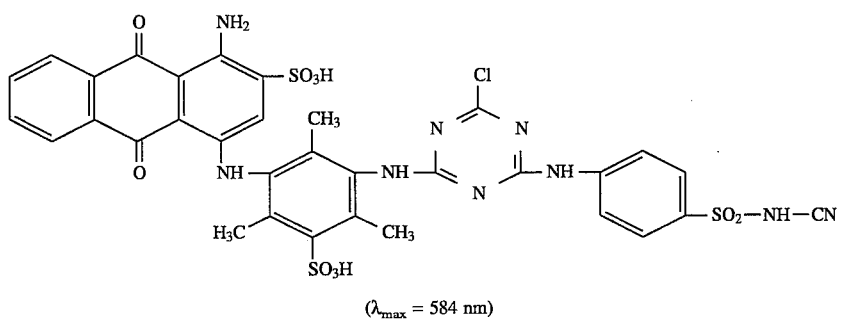

($\lambda_{max}$ = 584 nm)

and shows very good dye properties. Applied to the materials mentioned in the description, in particular cellulose fiber materials, such as cotton, by the techniques customary in the art for fiber-reactive dyes it produces strong, fast dyeings and prints in brilliant blue shades having good fastness properties.

EXAMPLE 2

Example 1 is repeated with the equivalent amount of 1-amino-4-(2'-methyl-3'-aminophenyl)aminoanthraquinone- 2,5'-disulfonic acid, affording the novel anthraquinone dye of the formula

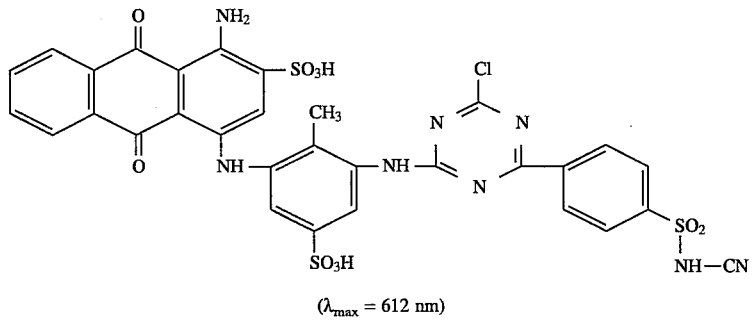

($\lambda_{max}$ = 612 nm)

in the form of the sodium salt. Applied to and fixed on the materials mentioned in the description, in particular cellulose fiber materials, by the techniques customary in the art for fiber-reactive dyes it produces strong, fast, brilliant blue dyeings and prints.

EXAMPLE 3

To a solution of 51 parts of 1-amino-4-(3'-amino-2',4',6-trimethylphenyl)aminoanthraquinone-2, 4 '-disulfonic acid in 350 parts of water at 0° C. are gradually added in the course of about 10 minutes, at that temperature and at a pH of 5, 10 parts by volume of cyanuric fluoride; during the reaction the pH of 5 is maintained with aqueous 2N sodium hydroxide solution. Then 23 parts of 4-cyanamidosulfonylaniline are added, the temperature of the batch is raised to 5°–10° C. and the reaction is carried out at a pH of 6 in the course of 3 hours.

The anthraquinone dye of the invention is salted out with sodium chloride and isolated in the form of the sodium salt as a blue powder that contains sodium chloride. Written in the form of the free acid it has the formula

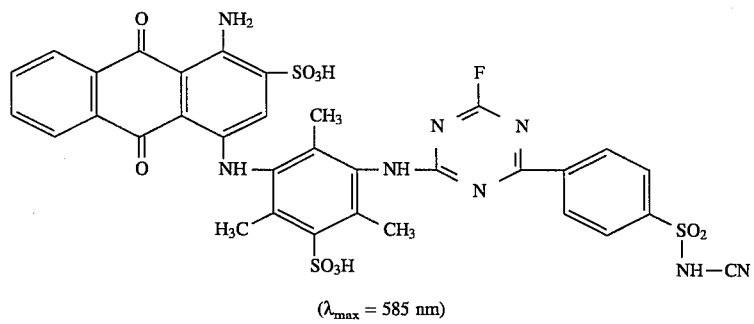

($\lambda_{max}$ = 585 nm)

shows very good dye properties and dyes for example cotton by the application techniques customary in the art for fiber-reactive dyes in fast, brilliant blue shades.

EXAMPLE 4

A 0° C. solution of 65 parts of 1-amino-4-(3'-aminophenyl)-aminoanthraquinone-2,4'-disulfonic acid in 350 parts of water is slowly act mixed with 13.5 parts by volume of cyanuric fluoride while a pH of 5 is maintained. The batch is subsequently stirred for about a further minutes. Then 24.8 parts of 2-methoxy-5-cyanamidosulfonylaniline are added, the temperature of the batch is raised to 10° C., the reaction is carried out in the course of about 3 hours while a pH of between 6 and 6.5 is maintained.

The anthraquinone dye of the invention is isolated from the synthesis solution by salting out with sodium chloride. Written in the form of the free acid it has the formula

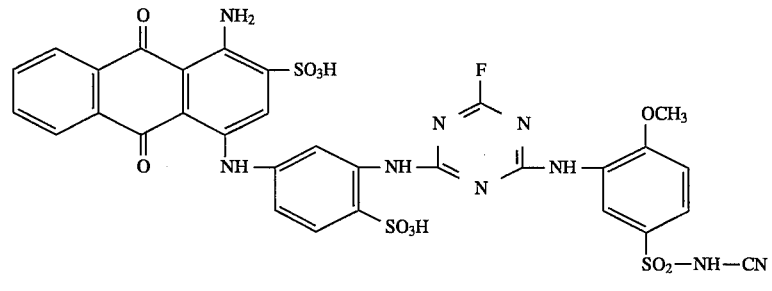

($\lambda_{max}$ = 600 nm)

and applied to the materials mentioned in the description, in particular cellulose fiber materials, by the known techniques for fiber-reactive dyes produces deep blue shades having good fastness properties.

EXAMPLES 5 TO 24

The Table Examples which follow describe further novel anthraquinone dyes conforming to a formula (A)

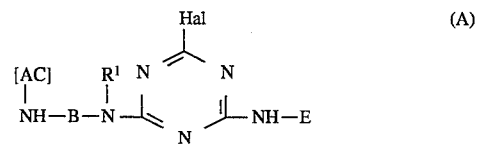

in terms of their components (the anthraquinone radical AC conforming to the formula (a)

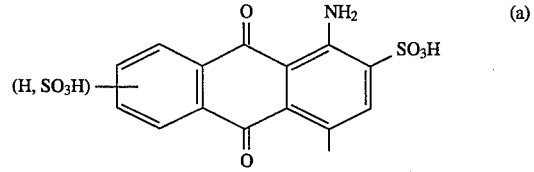

the bivalent radical B, the halogen atom chlorine or fluorine, and the cyanamidosulfonylphenyl radical E). They are preparable in a manner according to the invention, for example analogously to one of the above-described Examples, using an anthraquinone compound conforming to the formula AC-NH-B-NHR$^1$, cyanuric chloride or cyanuric fluoride, and a cyanamidosulfonylaniline compound conforming to the formula H$_2$N-E. These novel anthraquinone dyes have very good fiber-reactive dye properties and dye the materials mentioned in the description, in particular cellulose fiber materials, such as cotton, in the hue reported in the respective Table Example (for cotton) in high color strength and good fastness properties.

| Ex. | AC | Anthraquinone dye of the formula (A) | | | | Hue |
|---|---|---|---|---|---|---|
| | | B | R¹ | Hal | E | |
| 5 | 1-Amino-2-sulfo-anthraquinon-4-yl | 5-Sulfo-2,4,6-trimethyl-1,3-phenylene | H | Chlorine | 2-Chloro-5-cyanamidosulfonylphenyl | blue (585) |
| 6 | 1-Amino-2-sulfo-anthraquinon-4-yl | 5-Sulfo-2,4,6-trimethyl-1,3-phenylene | H | Chlorine | 2-Methoxy-5-cyanamidosulfonylphenyl | blue (613) |
| 7 | 1-Amino-2-sulfo-anthraquinon-4-yl | 5-Sulfo-2,4,6-trimethyl-1,3-phenylene | H | Chlorine | 2,5-Dimethoxy-4-cyanamidosulfonylphenyl | blue (584) |
| 8 | 1-Amino-2,7-disulfoanthraquinon-4-yl | 1,4-Cyclohexylene | H | Chlorine | 2,5-Dimethoxy-4-cyanaminosulfonylphenyl | blue (584) |
| 9 | 1-Amino-2,7-disulfoanthraquinon-4-yl | 1,4-Cyclohexylene | H | Chlorine | 4-Cyanamidosulfonylphenyl | blue |
| 10 | 1-Amino-2-sulfoanthraquinon-4-yl | 6-Sulfo-4-methyl-1,2-phenylene | CH₃ | Chlorine | 4-Cyanamidosulfonylphenyl | blue |
| 11 | 1-Amino-2-sulfoanthraquinon-4-yl | 6-Sulfo-4-methyl-1,2-phenylene | CH₃ | Chlorine | 2-Methoxy-5-cyanamidosulfonylphenyl | blue |
| 12 | 1-Amino-2-sulfoanthraquinon-4-yl | 3-Sulfo-1,4-phenylene | CH₃ | Chlorine | 4-Cyanamidosulfonylphenyl | blue |
| 13 | 1-Amino-2-sulfoanthraquinon-4-yl | 3-Sulfo-1,4-phenylene | CH₃ | Chlorine | 2-Chloro-5-cyanamidosulfonylphenyl | blue |
| 14 | 1-Amino-2-sulfoanthraquinon-4-yl | 3-Sulfo-1,4-phenylene | H | Chlorine | 2-Methoxy-5-methyl-4-cyanamidosulfonylphenyl | blue (612) |
| 15 | 1-Amino-2-sulfoanthraquinon-4-yl | 5-Sulfo-2-methyl-1,3-phenylene | H | Fluorine | 4-Cyanamidosulfonylphenyl | blue (612) |
| 16 | 1-Amino-2-sulfoanthraquinon-4-yl | 5-Sulfo-2,4,6-trimethyl-1,3-phenylene | H | Fluorine | 2,5-Dimethoxy-4-cyanamidosulfonylphenyl | blue (584) |
| 17 | 1-Amino-2-sulfoanthraquinon-4-yl | 5-Sulfo-2,4,6-trimethyl-1,3-phenylene | H | Fluorine | 2-Methoxy-5-cyanamidosulfonylphenyl | blue (584) |
| 18 | 1-Amino-2,7-disulfoanthraquinon-4-yl | 1,4-Cyclohexylene | H | Fluorine | 2-Methoxy-5-cyanamidosulfonylphenyl | blue |
| 19 | 1-Amino-2,7-disulfoanthraquinon-4-yl | 1,4-Cyclohexylene | H | Fluorine | 4-Cyanamidosulfonylphenyl | blue |
| 20 | 1-Amino-2-sulfoanthraquinon-4-yl | 6-Sulfo-4-methyl-1,2-phenylene | CH₃ | Fluorine | 4-Cyanamidosulfonylphenyl | blue |
| 21 | 1-Amino-2-sulfoanthraquinon-4-yl | 6-Sulfo-4-methyl-1,2-phenylene | H | Fluorine | 2-Methoxy-5-cyanamidosulfonylphenyl | blue |
| 22 | 1-Amino-2-sulfoanthraquinon-4-yl | 3-Sulfo-1,4-phenylene | CH₃ | Fluorine | 4-Cyanamidosulfonyl phenyl | blue |
| 23 | 1-Amino-2-sulfoanthraquinon-4-yl | 3-Sulfo-1,4-phenylene | CH₃ | Fluorine | 2,5-Dimethoxy-4-cyanamidosulfonylphenyl | blue |
| 24 | 1-Amino-2-sulfoanthraquinon-4-yl | 3-Sulfo-1,4-phenylene | CH₃ | Fluorine | 2-Methoxy-5-cyanamidosulfonylphenyl | blue |

It is claimed:
1. An anthraquinone compound of the formula

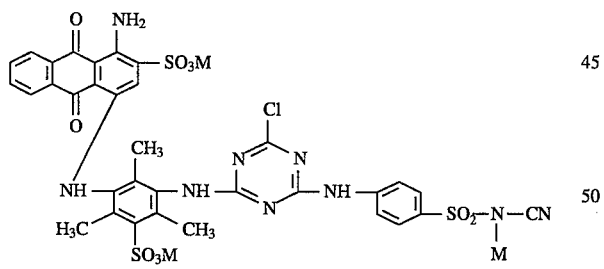

where M is hydrogen or an alkali metal or the mole equivalent of an alkaline earth metal.

* * * * *